United States Patent [19]

Lee et al.

[11] Patent Number: 5,040,933

[45] Date of Patent: Aug. 20, 1991

[54] TRAILER FOR CYLINDRICAL CONTAINER MODULES

[75] Inventors: Andrew Lee, New Philadelphia, Ohio; Dale R. Maurer, Hope, Ark.; Joseph D. Knight, New Philadelphia, Ohio; Victor E. Bergsten, East Amherst, N.Y.

[73] Assignee: Union Carbide Industrial Gases Technology Corporation, Danbury, Conn.

[21] Appl. No.: 520,619

[22] Filed: May 8, 1990

[51] Int. Cl.⁵ .......................... B60P 3/22; B61D 5/02
[52] U.S. Cl. ...................................... 410/42; 211/71; 410/35; 410/36; 280/837
[58] Field of Search .................. 410/31, 32, 33, 34, 410/35, 36, 37, 41, 42, 43, 48, 49; 280/837; 211/71, 194

[56] References Cited

U.S. PATENT DOCUMENTS

| | | | |
|---|---|---|---|
| 1,661,000 | 2/1928 | Madden et al. | 410/48 X |
| 2,428,893 | 10/1947 | Procissi | 410/31 |
| 2,761,397 | 9/1956 | Holst | 280/837 |
| 3,166,196 | 1/1965 | Hereth et al. | 410/42 X |
| 3,479,043 | 11/1969 | Piehl | 410/42 |
| 4,175,666 | 11/1979 | Smith | 410/42 X |
| 4,391,377 | 7/1983 | Ziaylek, Jr. | 211/71 |
| 4,412,615 | 11/1983 | Forshee | 410/31 X |
| 4,545,710 | 10/1985 | Hepp | 410/32 |
| 4,784,399 | 11/1988 | Finn | 410/42 |

Primary Examiner—David A. Bucci
Assistant Examiner—Robert S. Katz
Attorney, Agent, or Firm—Peter Kent

[57] ABSTRACT

A trailer for cylindrical fluid containers, particularly compressed gas tubes, arranged in modules individually removable from the trailer. Each module has a front and a rear bulkhead between which tubes are supported. The tubes have reduced cylindrical ends which protrude through and are supported in openings in the bulkheads. At least one end of the tubes is threaded and clamped by a nut or a collar flange to a bulkhead. Each bulkhead has a stiffening, right-angle flange along each vertical edge which aligns with and is clamped to each adjacent module. At their bottom, the bulkheads abut and are attached to an upwardly extending side of an L-shaped structural member, the other side being mounted to the trailer frame. The tubes are arranged in line horizontally and vertically with space between them.

13 Claims, 3 Drawing Sheets

TRAILER FOR CYLINDRICAL CONTAINER MODULES

BACKGROUND OF THE INVENTION

This invention is directed generally to a trailer for storing or transporting elongated cylindrical fluid containers and specifically to a trailer for tubes for containing compressed gas. Such trailers are intended to be attached to and drawn by a tractor. Trailers have a flat horizontal frame on which, pursuant to prior art, a bottom layer of tubes is supported. Succeeding layers are stacked up with lower tubes supporting those above to form a compact bundle. Often, supports are provided at spaced intervals along the tube length and retainers are used to secure the bundle to the frame. Sometimes the tubes are retained at least in part at their ends between a front bulkhead and a rear bulkhead which are attached to the frame. The tubes have a reduced diameter at each end which protrude through openings in the bulkheads and are mechanically attached to the bulkheads. Usually the tube ends bear an external thread on which nuts are threaded to clamp the tubes to the bulkheads. At one end of the trailer, the tube ends are manifolded and piping is provided for supplying gas to, and withdrawing compressed gas from, the tubes.

A problem encountered in bundles where tubes contact or are contacted by intermediate supports is that rusting occurs at the contact points. This problem is obviated by supporting the tubes solely at their ends and providing a clearance space between the tubes, an arrangement shown in U.S. Pat. No. 2,761,397 issued to Holst.

Periodically, the tubes must be tested for structural integrity. A bundle where tubes support each other must be disassembled to allow hydrostatic testing of each tube, which is an expensive, lengthy procedure. The development of acoustic emission techniques offers an alternative to hydrostatic testing, providing the tube surface is accessible for the placement of sensors and no supports exist along the tube length to interfere with the transmission and analysis of the acoustic emission signals. Thus, spacing the tubes and supporting them solely at their ends as shown by Holst allows acoustic testing. However if a tube needs to be replaced, the Holst arrangement still requires disassembly of the tube bundle.

The above disadvantage is partially overcome by the modular arrangement shown in U.S. Pat. No. 4,784,399 issued to Finn. Finn stacks horizontally extending modules of tubes to build up a tube bundle. This arrangement creates joints between modules which are subject to high shear loads imposed by the inertial forces developed by the tubes during starting, stopping and changing direction of the trailer. To take up some of this loading, Finn relies on vertical rods which help stabilize and unify the tube modules. Also, in Finn's arrangement, when a tube in a lower position needs to be removed for maintenance or replacement, all of the tube modules above the module containing the defective tube must be removed. These and other disadvantages experienced with prior art tube trailers are obviated by the present invention.

A principal object of the present invention is to provide a tube trailer wherein the tubes are supported in modules which can be individually removed from the trailer and which will facilitate removal of any tube.

Another object of the invention is to provide tube modules which can be readily affixed to the trailer frame and are inherently accommodative of inertial loads imposed by the tubes.

Another object of the invention is to provide a tube trailer wherein the tubes are spaced to allow some types of testing and maintenance without module removal and disassembly.

Still another object is to provide a tube trailer in which valves mounted in the ends of the tubes are shielded by the tube support structure from physical damage by outside agencies approaching from the side of a tube module.

With these and other objects in view, as will be apparent to those skilled in the art, the present invention resides in the combination of parts as set forth in the specification and particularly pointed out in the claims.

SUMMARY OF THE INVENTION

This invention is directed to a cylindrical-container-bearing trailer having a supporting frame on which modules retaining a plurality of tubes are mounted. Each module has a front and a rear bulkhead for retaining tubes between the bulkheads. Each bulkhead has openings through which the reduced ends of the tubes protrude, are supported by and are clamped to the bulkhead. At its lower end, a bulkhead mates against and is attached to an upwardly extending, transversely running flange which is one side of a structural member, which is fixed to, or is integral with the frame.

Each bulkhead has a flange running at a right angle to and along each of its vertical edges. The modules are positioned on the trailer frame so that the front bulkheads and the rear bulkheads respectively are aligned and the flanges of adjacent bulkheads abut. The abutting flanges are clamped together to structurally unify the modules. Very advantageously, these flanges also serve as stiffeners for the bulkheads and effectively resist the inertial loads imposed by the tubes. With the flanges on the front bulkheads oriented to extend forward and those on the rear bulkheads rearward, the respective tube ends, their valves and their manifolding are thereby shielded against objects which could approach from the side of a module and cause physical damage to these vulnerable components. The tube-supporting openings in the bulkheads are arranged so as to provide spaces between tubes for acoustic testing and minor maintenance. For full access to any tube, its module may be individually removed, whereafter the tube may be serviced in the module or after removal from the module.

DESCRIPTION OF THE PREFERRED EMBODIMENT

Figure 1:
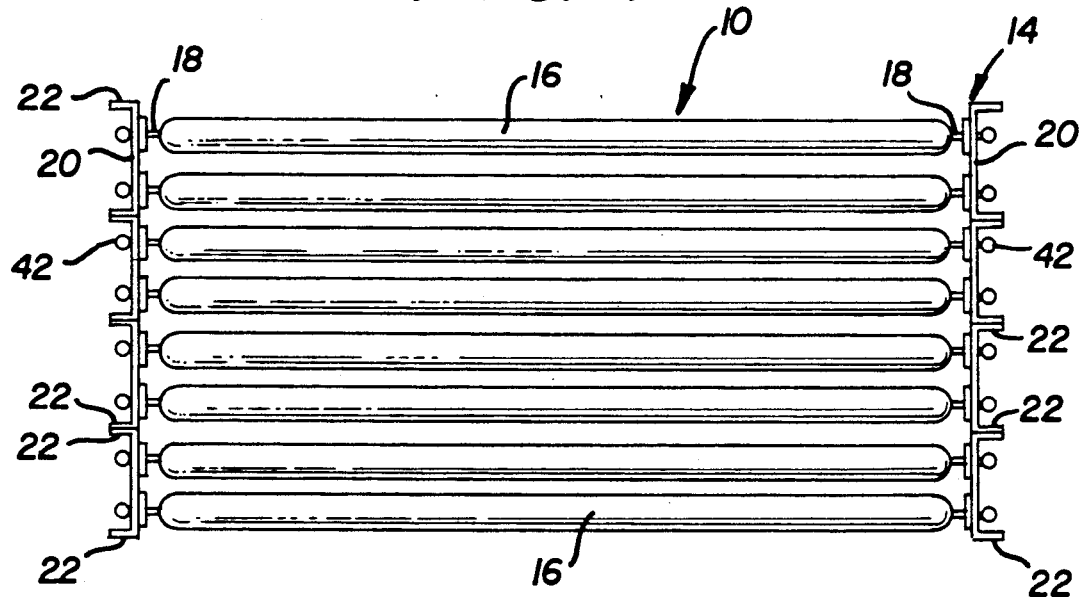
FIG. 1 is a plan view of a trailer embodying the principles of the present invention.
Figure 2:
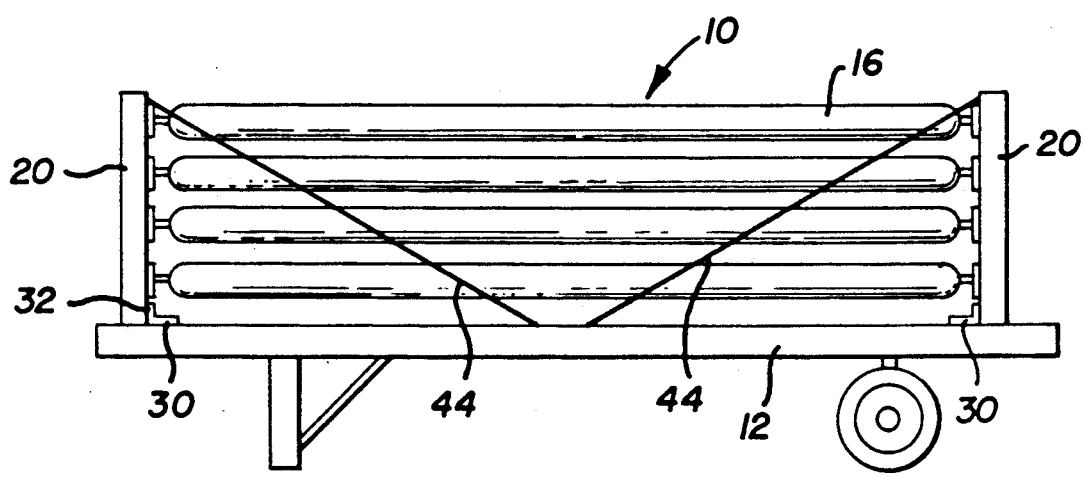
FIG. 2 is a side elevational view of the trailer.
Figure 3:
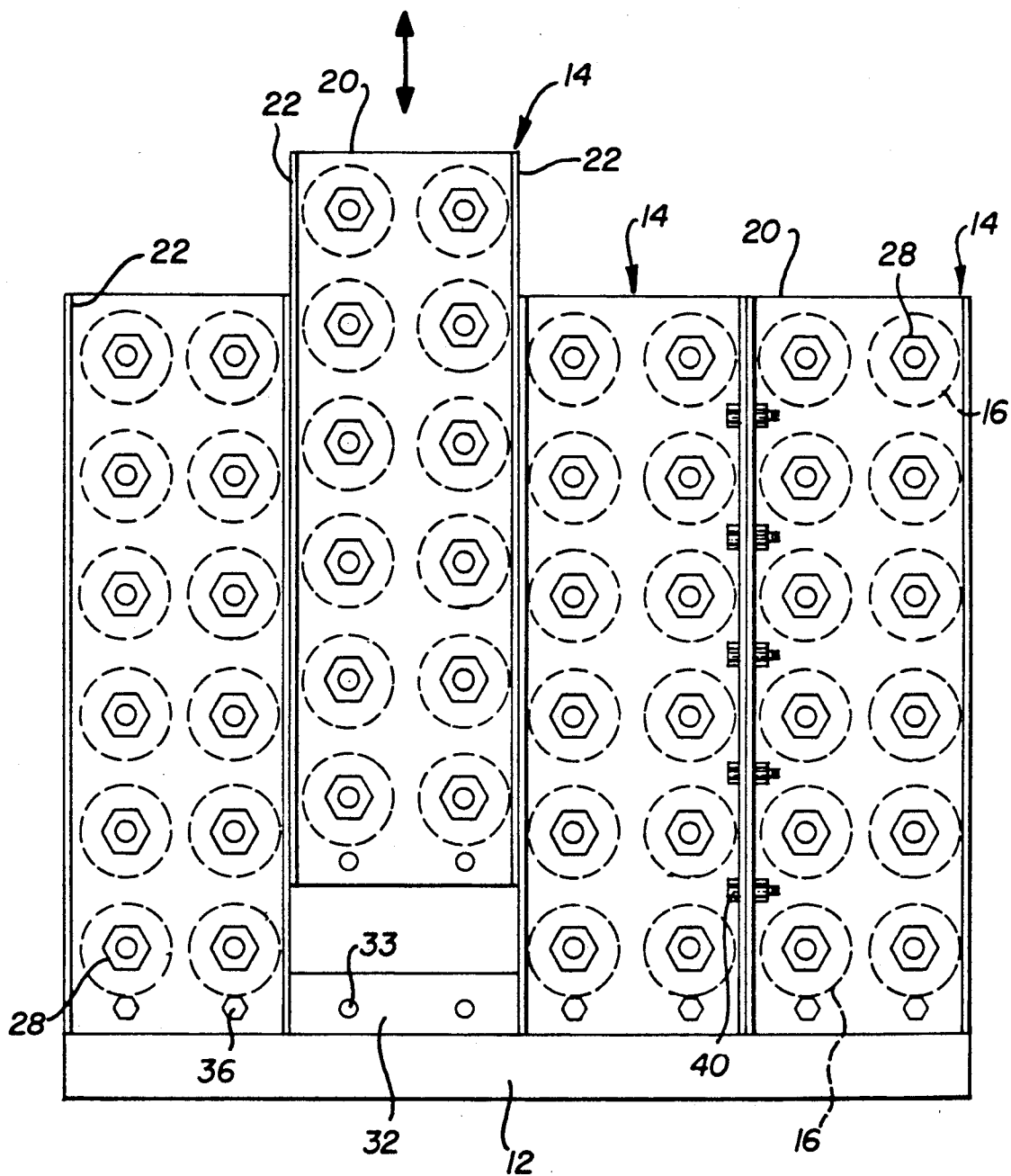
FIG. 3 is a front and a rear side elevational view of the trailer with one tube module partially removed.
Figure 6:
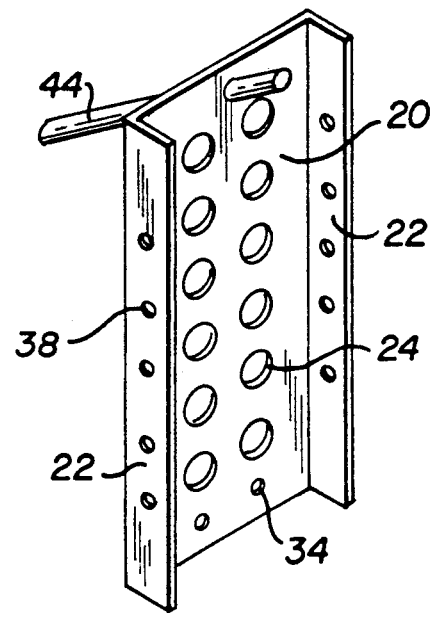
FIG. 6 is a perspective view of a bulkhead.
Figure 5:
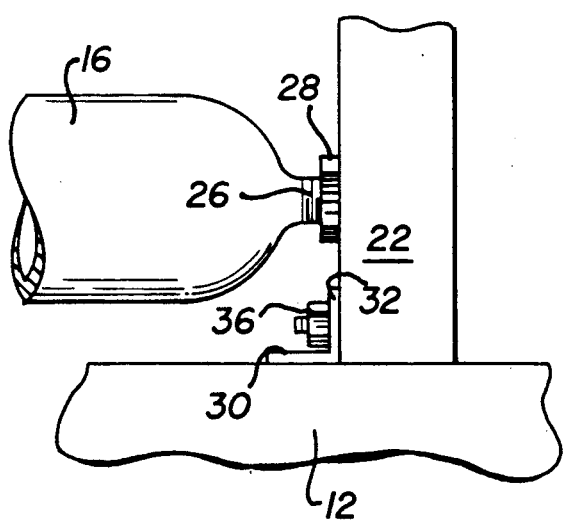
FIG. 5 is a fragmentary side elevational view of a tube bundle end adjacent to the frame of the trailer.

While the trailer to which this invention is directed is suitable for fluids in general, it is particularly useful for compressed gases and will be described with respect to that application. In FIGS. 1 and 2, the tube trailer, indicated generally by the reference numeral 10, has a generally horizontal, supporting flat frame 12 upon which a plurality of tube modules 14 are supported. The modules are comprised of a plurality of elongated, cylindrical, gas-containing tubes 16, whose extremities reduce to cylindrical ends 18 of smaller cross section. Each module 14 has a front bulkhead 20 and a rear bulkhead 20, (shown in perspective in FIG. 6) vertically oriented and supported by the trailer frame 12. Each bulkhead 20 has a right-angle flange 22 along each of its vertical edges for stiffening the bulkhead.

Figure 4:
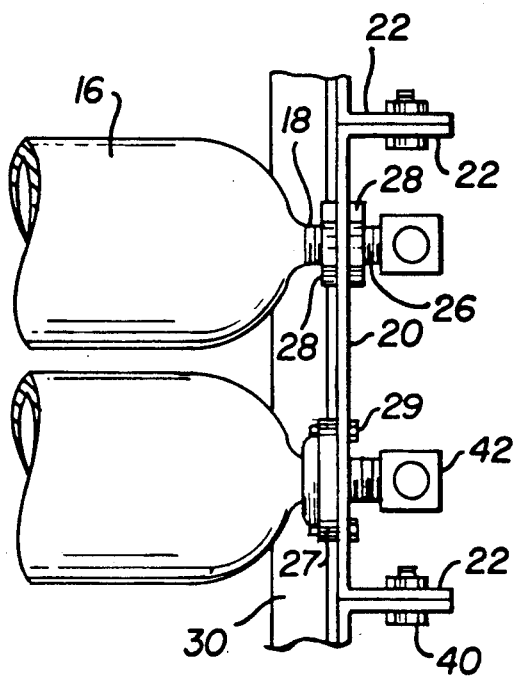
FIG. 4 is a fragmentary plan view of one end of the tube bundle showing two alternate means for supporting tube ends.

Each bulkhead 20 also has an array of openings 24 through which tube ends 18 protrude. Each tube end is provided with a thread 26. Associated with each opening 24 is a means for supporting the tube end 18. One such means, shown in FIG. 4, is a pair of nuts 28 which are threaded onto tube end 18 and clamp the tube end to the bulkhead 20. Another means of supporting the tube ends, also shown in FIG. 4, is a collar flange 27 which is threaded onto a tube end 18 and fastened to bulkhead 20 by fastening means such as bolts 29. The array of openings 24 in bulkheads 20 which accept the tube ends 18 preferably arrange the tubes 16 horizontally and vertically in line and with space between them. A module 14 may contain one tube 16, a plurality of tubes, a single column of tubes or multiple columns of tubes, as may be suited to a particular application.

Each bulkhead 20 at its bottom is mounted to the frame 12 by a mounting means which provides an upright flange 32 running transversely on the frame 12. The upright flange 32 may be provided by a structural member 30 of L-shaped cross section, one side of which is attached to the frame 12, as by welding. Alternatively, the member 30 may be integral with the frame 12. The mounting means includes apertures 33 in the upright flange 32, apertures 34 in the bulkhead 20 and bolts 36 passing through these apertures and clamping the bulkhead 20 to the flange 32.

Upright flange 32 is fixed on the frame 12 and bulkheads 20 are attached to it so that the flanges 22 of adjacent bulkheads are aligned. The aligned flanges are clamped together by clamping means which includes holes 38 in flanges 22 and bolts 40 passing therethrough.

Tube ends 18 are fitted with valves 42 for admitting gas to and withdrawing gas from the tubes, and for relieving excess pressure. Tie rods 44 having one end attached near the top of support plates 20 and at the other end to the frame 12 provide additional capability for resisting inertial forces developed from the tubes.

Figure 7:
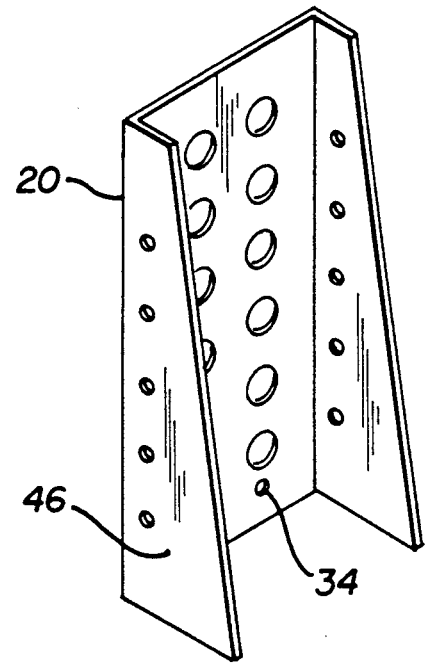
FIG. 7 is a perspective view of another embodiment of a bulkhead.

In an alternative embodiment, bulkheads 20 have along their vertical edges flanges 46 of trapezoidal shape with the lower edge of the trapezoid longer than the upper. The trapezoidal flanges 46 shown in FIG. 7 provide greater stiffening for bulkheads 20 than the rectangular flanges 22 shown in FIG. 6. In addition, the trapezoidal flanges 46 can accept and transmit to the frame 12 greater inertial loads imposed by the tubes than the rectangular flanges 22, making tie rods 44 superfluous.

From the above description of the invention, its many advantages should now be apparent. Supporting the tubes 16 solely from their ends between bulkheads 20 allows clearance spacing between the tubes so that testing of the tubes can be performed in-situ. Arranging the tubes in modules 14 allows any module to be removed from the frame 12 individually, thereby facilitating access to and removal of any tube, when necessary. The flanges on the bulkheads allow all the front bulkheads and all the rear bulkheads to be respectively clamped together to structurally unify the tube bundle. These flanges also stiffen the bulkheads 20, and by extending in the same plane as the inertial forces developed by the tubes during starting and stopping of the trailer resist these forces well. The flanges 22 also shield the valves mounted on the tube ends against physical damage by objects approaching from the side of the trailer. During a collision or rollover of the trailer, this shielding could prevent consequential damage such as separation of a valve and uncontrolled release of compressed gas.

The L-shaped member 30 with its horizontal side provides a large surface for attachment to the frame, and with its upright flange 32 provides a convenient mounting means for the bulkheads 20. The relative arrangement of bulkheads to mounting flanges also has an advantage. Each bulkhead abuts the tube side of its mounting flange as may be seen in FIG. 2. Hence, during forward acceleration of the trailer, the inertial force of the tubes will be exerted against the front mounting flange 32, and during deceleration the inertial force will be against the rear mounting flange. Thus the large inertial loads imposed during starting and stopping are not entirely transmitted through the bolts 36 which attach the bulkheads 20 to the upright flanges 32. Vibrations of the trailer from over-the-road travel act to loosen mechanical fasteners, so that a design which does not totally depend on mechanical fasteners is advantageous.

Although the invention has been described in detail with reference to certain embodiments, those skilled in the art will recognize that there are other embodiments within the spirit and scope of the claims.

What is claimed is:

1. A trailer for transporting and securing containers comprising:
   (a) a supporting load bed frame;
   (b) a plurality of vertically oriented and horizontally adjacently mounted modules, each module comprising:
      (1) a plurality of vertically spaced cylindrical fluid containers each, having cylindrical ends of reduced cross section;
      (2) front and rear bulkheads, each bulkhead having a flange running along a substantial amount of, and at a right angle to, each vertical edge of each bulkhead, each bulkhead having a plurality of vertically spaced openings through which the container ends protrude;
   (c) means for supporting the container ends in the bulkheads;
   (d) means for mounting bulkheads to the frame with the flanges of adjacent bulkheads aligned;
   (e) clamping means for clamping together said aligned flanges whereby any selected module may be detached and removed from the frame without requiring the removal of any other module from the frame; and 2. The trailer as in claim 1 wherein the means for supporting container ends comprises a thread on at least one end of a container and a nut threaded onto said end for clamping said end to the bulkhead through which it protrudes.

3. The trailer as claim 1 wherein the means for supporting container ends comprises a thread on at least one end of a container, a collar flange threaded onto said end, and a fastener for attaching said collar flange to a bulkhead.

4. The trailer as in claim 1 wherein the clamping means comprises bolts clamping aligned flanges together.

5. The trailer as in claim 1 wherein said mounting means comprises a mounting member of L-shaped cross section, one side of the L being mounted to the frame and the other side forming an upright flange to which the bottom of a bulkhead is attached.

6. The trailer as in claim 5 wherein the bottom of a bulkhead and the upright flange of the mounting member have apertures through which bolts pass to attach the bulkhead and member.

7. The trailer as in claim 1 wherein adjacent containers are spaced so they do not contact.

8. The trailer as in claim 6 wherein said vertically spaced containers are vertically superposed.

9. The trailer as in claim 6 wherein additional vertically spaced containers are arranged horizontally in line with said vertically spaced containers.

10. The trailer as in claim 1 wherein said flanges on said bulkheads extend in the same direction as the ends of the containers supported by said bulkheads.

11. The trailer as in claim 1 wherein said vertical flanges on said bulkheads are rectangular.

12. The trailer as in claim 1 wherein said vertical flanges on said bulkheads are trapezoidal with the lower edge of the trapezoid longer than the upper edge.

13. The trailer as in claim 2 wherein the clamping means comprises bolts clamping aligned flanges together, the mounting means comprises a mounting member of L-shaped cross section, one side of the L being mounted to the frame and the other side forming an upright flange to which the bottom of a bulkhead is attached, and adjacent containers are spaced so they do not contact.

* * * * *

UNITED STATES PATENT AND TRADEMARK OFFICE
CERTIFICATE OF CORRECTION

PATENT NO. : 5,040,933
DATED : August 20, 1991
INVENTOR(S) : Lee et al.

It is certified that error appears in the above-identified patent and that said Letters Patent is hereby corrected as shown below:

Column 4, line 66, delete "; and" and insert therefor -- . --.

Signed and Sealed this

First Day of December, 1992

Attest:

DOUGLAS B. COMER

Attesting Officer

Acting Commissioner of Patents and Trademarks